No. 45,220.   PATENTED NOV. 29, 1864.
N. H. BORGFELDT.
AIR PUMP.
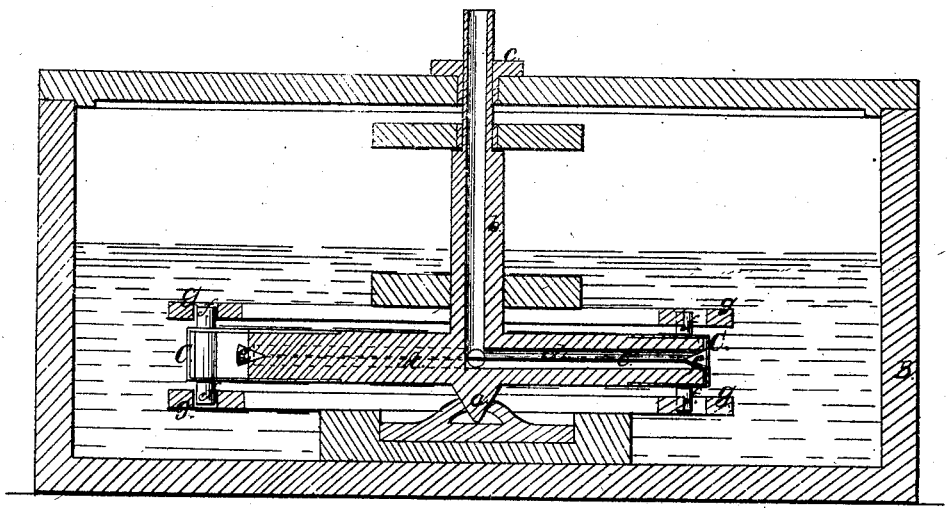
Fig. 2.
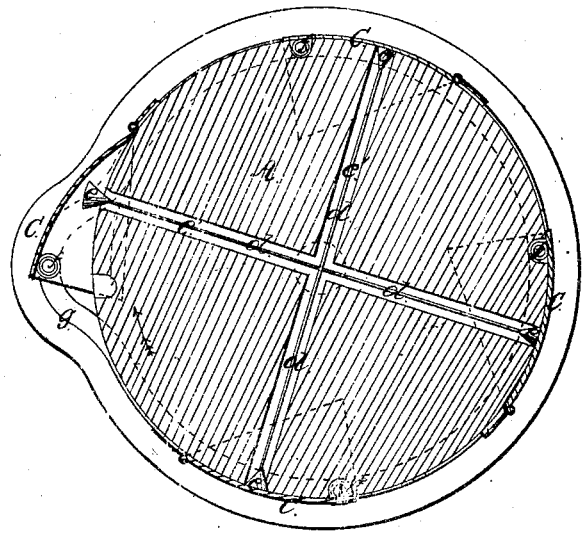
Witnesses:   Inventor:

UNITED STATES PATENT OFFICE.

N. H. BORGFELDT, OF NEW YORK, N. Y.

IMPROVEMENT IN AIR-PUMPS.

Specification forming part of Letters Patent No. 45,220, dated November 29, 1864.

*To all whom it may concern:*

Be it known that I, N. H. BORGFELDT, of the city, county, and State of New York, have invented a new and Improved Air-Pump; and I do hereby declare that the following is a full, clear, and exact description thereof, which will enable those skilled in the art to make and use the same, reference being had to the accompanying drawings, forming part of this specification, in which—

Figure 1 represents a vertical central section of this invention. Fig. 2 is a horizontal section of the same.

Similar letters of reference indicate corresponding parts.

This convention consists in a disk revolving under water and provided with a central air-supply or suction pipe, and with one or more radial discharge-channels closed by valves, in combination with one or more wings placed over the end or ends of the radiating discharge-channels, and made to open by a cam at certain stated intervals during the revolution of the disk in such a manner that whenever one of the wings is opened or thrown off from the periphery of the disk a vacuum is formed, (the water having no time to occupy the space left empty by the motion of the wing,) and the external air rushes in, opens the valve, and occupies the empty space, and when the wing closes the air escapes up through the water and collects on the surface thereof. In this manner an air-pump is produced with one or more movable parts, which, when moving in one direction, work against the pressure of the air previously compressed by the action of the pump, and at the same time create a vacuum to be occupied by the external air, and which, when moving in the opposite direction, are partially or wholly propelled by the action of the air previously compressed, and the expulsion of the fresh air which entered to fill the vacuum is facilitated.

A represents a disk made of metal, wood, or any other suitable material. It has its bearings on a conical point, $a$, and on a tube, $b$, said conical point being stepped into a suitable socket on the bottom of the box B, whereas the tube $b$ extends up through a stuffing-box, $c$, in the top of the box, as clearly shown in Fig. 1 of the drawings. The tube $b$ communicates with a series of radiating channels, $d$, which extend out through the periphery of the disk, each being closed by a spring-valve, $e$. For the sake of convenience, an even number of radiating channels is made in the disk, and the valves of those channels which extend from the center in opposite directions are connected by elastic cords, $e'$, so that by these cords the valves are held in their seats with sufficient power to prevent them from opening spontaneously. The mouth of each of the radiating channels is covered by a wing, C, which is hinged to the disk, so that it opens and closes, as shown in Figs. 1 and 2, where one of the wings is open and the others closed. These wings are operated by studs $f$, which project from their upper and lower edges, and move in cam-grooves $g$, which are secured in the box B above and below the disk. To reduce the friction, the studs $f$ are provided with friction-rollers, and the cam-grooves are so shaped that they keep the wings closed throughout the entire revolution of the disk, with the exception of a very short space of time where each wing is suddenly opened, and then again closed.

The motion of the disk takes place in the direction of the arrow marked on it in Figs. 2, and when one of the wings opens the water has no time to occupy the space left empty by said wing, and a vacuum is formed causing the external air to rush down through the tube $b$, to open the valve under the open wing and to fill the empty space. If the wing closes, the air thus caught under it is forced out through the water, and it collects on the surface of the water in the box.

It is obvious that the motion of the disk must be sufficiently quick to prevent the water from occupying the empty space, which, however, is a very easy matter, when it is considered that the disk need not be covered by more than three or four inches of water. If it is covered by three inches of water, the velocity with which the water seeks to occupy the empty space is equal to—

$$V = \sqrt{vg \cdot \tfrac{1}{4}}$$

or four feet per second; and the disk, which is supposed to have a diameter of at least two feet, can easily be rotated with a velocity of sixty or more revolutions per minute, giving each wing a velocity of six or more feet per second. The air which acts under a column of air of at least twenty-five thousand feet falls with a velocity of about thirteen hundred feet per second, so that it will occupy the empty space under all circumstances, and for each motion of each wing a certain quantity of air is forced into the box.

It is obvious that by this operation a large quantity of air can be compressed in the box; but how far the compression can be carried on depends upon the velocity of the disk, because the pressure of the air acting on the surface of the water increases the velocity with which the water seeks to occupy the empty space. For instance, if the pressure of the air in the box is equal to sixteen pounds to the square inch, the velocity with which the water seeks to occupy the empty space will be forty-two feet per second, and a two-foot disk would have to be rotated at the rate of four hundred revolutions per minute in order to produce the desired result.

The power requisite to revolve the disk and to open and close the wings is not increased by the compressed air, because the same power which opposes the opening of the wings assists in closing the same and in forcing the air occupying the space under the wing out through the water.

A large quantity of air can thus be compressed into the box with comparatively little power, and a forced current of air can thus be created, which can be used with great advantage in various mechanical or chemical operations; or the compressed air may be used as a motive power, if desired.

I claim as new and desire to secure by Letters Patent—

1. A centrifugal air-pump the working or pumping part of which acts under water or other liquid.

2. The disk A, revolving under water or other liquid and provided with a central supply-pipe, $b$, and one or more radial discharge-channels, $d$ in combination with spring-valves $e$, and wings C, constructed and operating substantially as and for the purpose set forth.

3. The application of a cam-groove, $g$, in combination with the wing or wings C and revolving-disk A, constructed and operating sustantially as and for the purpose specified.

N. H. BORGFELDT.

Witnesses:
WM. F. MCNAMARA,
J. P. HALL.